UNITED STATES PATENT OFFICE.

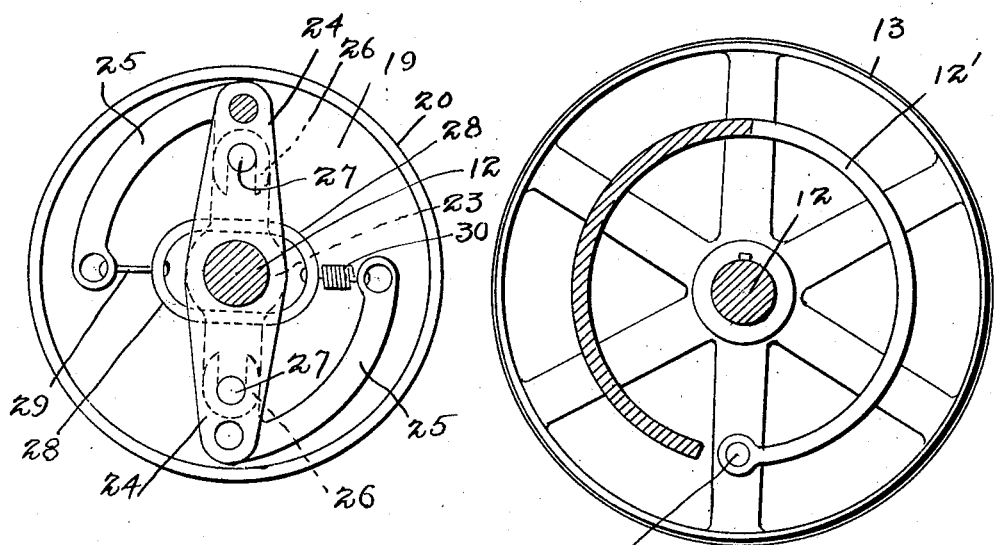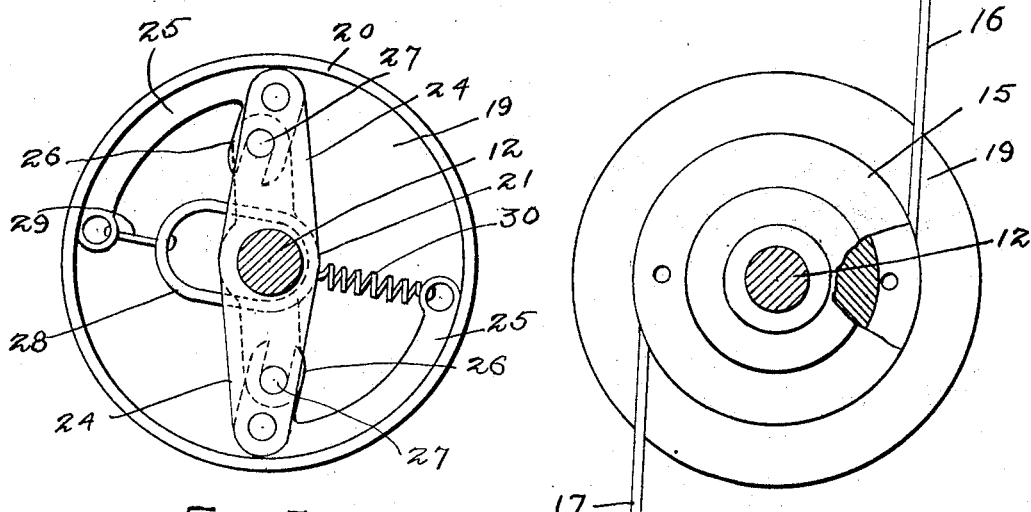

ANTON G. H. ANDERSON, OF SPRINGFIELD, ILLINOIS.

SPEED-REGULATOR FOR WINDMILLS.

1,397,713.  Specification of Letters Patent.  Patented Nov. 22, 1921.

Application filed October 8, 1918. Serial No. 257,359.

*To all whom it may concern:*

Be it known that I, ANTON G. H. ANDERSON, a citizen of the United States, residing at Springfield, in the county of Sangamon, State of Illinois, have invented certain new and useful Improvements in Speed-Regulators for Windmills; and I do hereby declare the following to be a full, clear, and exact description of the invention, such as will enable others skilled in the art to which it appertains to make and use the same.

This invention relates to new and useful improvements in speed regulators and particularly to speed regulators for windmills.

One object of the present invention is to provide a novel and improved device of this character whereby when an excessive load is placed on the transmission shaft by the windwheel the said shaft will be checked in its rotation and prevented from turning too fast.

Another object is to provide a novel and improved device for automatically checking the speed of the transmission shaft when an excessive load is placed on the shaft by the windwheel, and automatically restoring the shaft to normal condition when the load has been removed.

Other objects and advantages will be apparent from the following description when taken in connection with the accompanying drawings.

In the drawings:

Fig. 3 is a vertical transverse sectional view taken on the line 3—3 of Fig. 2.

Fig. 4 is a vertical transverse sectional view taken on the line 4—4 of Fig. 2.

Fig. 5 is a sectional view on the same line as that of Fig. 3, but showing the parts in operative position.

Fig. 6 is an end elevation, partly broken away, showing the device in operative position.

Figure 1:
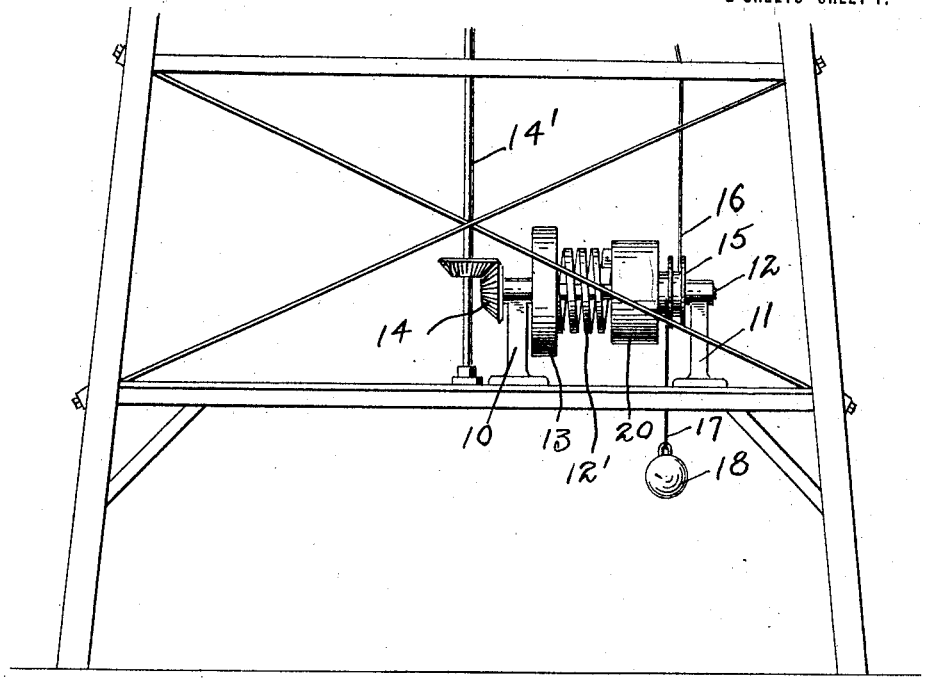
Figure 1 is an elevation of my improved speed regulator in connection with the necessary parts of a windmill.
Figure 2:
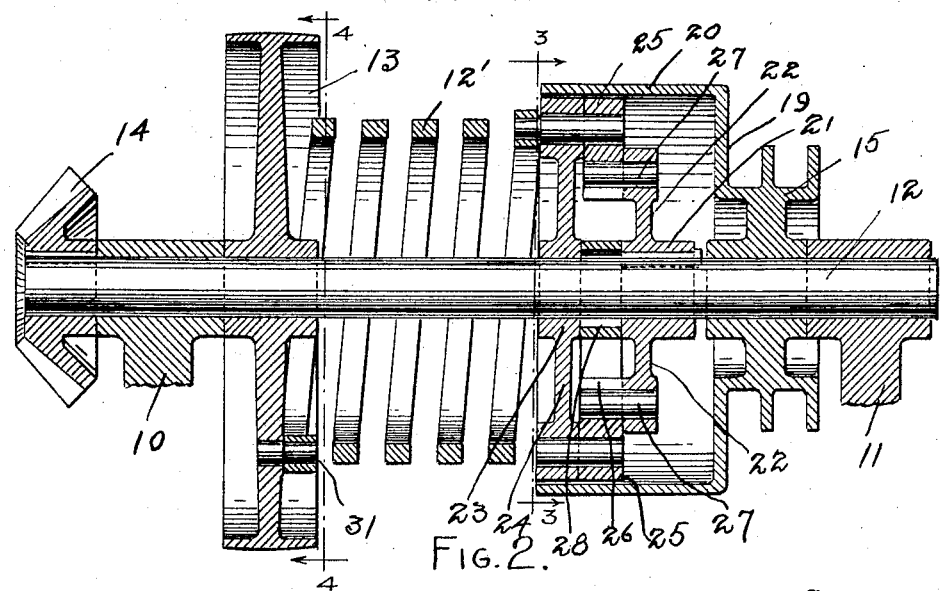
Fig. 2 is a vertical longitudinal sectional view through the regulator.

Referring particularly to the accompanying drawings, 10 and 11 represent journal bearing brackets in which are supported the ends of the horizontal shaft 12. Loosely rotatable on the shaft, adjacent the bracket 10 is a belt pulley 13, and secured on the shaft, outwardly of the bracket, is a transmission gear 14, for receiving motion from the vertical windmill shaft 14'. Loosely rotatable on the other end of the shaft, inwardly of the bracket 11, is a drum 15 to which is secured one end of a wire 16 which extends upwardly and is connected to the blade-feathering means (not shown) of the windwheel, (not shown). Connected to the diametrically opposite side of the drum is a depending cord or wire 17, a weight 18 being carried by its lower end, for a purpose which will presently appear herein. Formed integral with one end of the drum is a vertically disposed disk member 19 which has a peripheral, concentric, cylindrical flange 20. Keyed on the shaft 12, within the flange, is a hub 21, and extending radially in opposite directions from this hub, are the two arms 22. Loosely mounted on the shaft 12, within the flange 20, but outwardly of the hub 21, is a second hub member 23 having the opposite radial arms 24 formed thereon. Pivotally connected to the outer end of each of the arms 24 is an arcuate clutch shoe 25, the pivotal portion of which is formed with a bifurcated extension 26 directed toward the shaft as clearly seen in Figs. 3 and 5 of the drawings. Each of the arms 22 carries a pin 27 which engages in the bifurcation of one of said extensions. Disposed on the shaft is an elongated slotted frame 28, one end being connected to the outer end of one of the shoes 25 by a link 29, while the other end is connected to the outer end of the other arm 25 by a coil spring 30, to hold the shoes normally and yieldably out of contact with the flange 20 that constitutes a clutch drum.

Encircling the shaft 12, between the belt wheel 13 and the hub 23, is a large and strong helical spring 12', one end of which is secured to a spoke of the wheel by a pin 31, while the other end is secured to one of the arms 24, at the outer end of the latter.

Normally the clutch shoes 25 are out of contact with the flange 20 that constitutes the clutch drum. The shaft of the windmill operating at normal speed, drives the shaft 12 through the medium of the beveled gear of the shaft 14' which, as shown in Fig. 1 of the drawings, meshes with the beveled gear 14 that is fixed on the shaft. The hub 21, being fixed on the shaft 12, the arms 22 are carried around with the shaft, and they, by pressure of their pins 27 against the inwardly directed extensions 26 of the clutch shoes, carry such shoes with them, and therewith the arms 24 radiating from the hub 23, which latter is loose on the shaft 12. The spring 30 is of such tension that under normal speed of the shaft 12, the clutch shoes 25 are out of contact with the clutch drum 20, which latter stands idle.

As the arms 24 are thus carried around with the shaft 12, the helical spring 12' which is pinned to one of the arms 24 is rotated axially and by reason of being connected at its other end with the drive pulley 13 that is loose on the shaft 12, such drive pulley is rotated at the speed of the shaft.

When the speed of the shaft 14' increases, the speed of the shaft 12 also of course increases immediately, and this increased speed causes an outward swinging of the clutch shoes 25 due to centrifugal action and also to the fact that the increased resistance of the load consequent to the increased speed causes the arms 22 to creep ahead of the arms 24 until the clutch shoes 25 engage the drum 20. Immediately the frictional engagement between the clutch shoes and clutch drum is sufficient, the clutch drum begins to rotate, with slippage, at which time the winding drum 15 is caused to rotate to wind in on the wire 16 against the retarding influence of the weight 18 so that the windwheel is thrown correspondingly out of the wind in the well known manner. If the speed of the wheel then slows down, the mechanism of course operates conversely.

What is claimed is:

1. In a windmill speed regulator, a wind wheel driven shaft, a member driven therefrom and with respect to which the shaft is capable of limited independent motion, means for connection with a windwheel for throwing it out of operation and means operable upon movement of the windwheel driven shaft with respect to the driven member, for rendering the windwheel throwing mechanism active.

2. In a windmill speed regulator, a windwheel driven shaft, a member driven therefrom and with respect to which the shaft is capable of limited independent motion, means for connection with the windwheel for throwing it out of operation, said means including a winding drum having a weighted cord attached thereto to be wound thereon, and a cord to be wound thereon and adapted for attachment to the mechanism of the windwheel that throws it out of the wind, and a clutch mechanism operable upon movement of the wind wheel driven shaft with respect to the member that is driven therefrom, for clutching the winding drum to the windwheel driven shaft.

3. In a windmill speed regulator, a windwheel driven shaft, a driven power wheel mounted thereon, a resilient driving member connecting the wheel with the shaft and permitting of a degree of motion of the shaft independently of the wheel, a winding drum for winding thereon a cord for throwing the windwheel out of the wind, and a clutch mechanism operable upon movement of the shaft with respect to the said power wheel for clutching the winding drum to the shaft.

In testimony whereof, I affix my signature, in the presence of two witnesses.

ANTON G. H. ANDERSON.

Witnesses:
CHARLES B. CRABTREE,
EDWARD SMITH.